(12) United States Patent
Midkiff

(10) Patent No.: US 8,106,280 B2
(45) Date of Patent: Jan. 31, 2012

(54) DEVICES AND RELATED METHODS FOR TEACHING MUSIC TO YOUNG CHILDREN

(76) Inventor: Sofia Midkiff, Blacksburg, VA (US)

( * ) Notice: Subject to any disclaimer, the term of this patent is extended or adjusted under 35 U.S.C. 154(b) by 0 days.

(21) Appl. No.: 12/603,957

(22) Filed: Oct. 22, 2009

(65) Prior Publication Data

US 2011/0094367 A1    Apr. 28, 2011

(51) Int. Cl.
G09B 15/00    (2006.01)
(52) U.S. Cl. ...................................... 84/470 R
(58) Field of Classification Search ............... 84/470 R
See application file for complete search history.

(56) References Cited

U.S. PATENT DOCUMENTS

| | | | | |
|---|---|---|---|---|
| 292,312 | A * | 1/1884 | Hofer | 273/301 |
| 430,157 | A * | 6/1890 | Watson | 84/476 |
| 491,833 | A * | 2/1893 | Bowen et al. | 84/476 |
| 702,298 | A * | 6/1902 | Frederickson | 273/301 |
| 848,282 | A * | 3/1907 | Berg | 273/236 |
| 1,114,139 | A * | 10/1914 | Hoffman | 273/273 |
| 1,139,098 | A * | 5/1915 | Bostwick | 273/301 |
| 1,283,695 | A * | 11/1918 | Diriwachter | 84/476 |
| 1,392,977 | A * | 10/1921 | Swan | 273/301 |
| 1,526,547 | A * | 2/1925 | Hughey | 84/471 R |
| 1,599,568 | A * | 9/1926 | Koehler | 273/308 |
| 2,072,511 | A * | 3/1937 | Ross | 84/470 R |
| 2,582,544 | A * | 1/1952 | Johnson | 273/301 |
| 2,791,147 | A * | 5/1957 | Meadows | 84/470 R |
| 2,807,183 | A * | 9/1957 | Ney | 84/471 R |
| 2,879,685 | A * | 3/1959 | Page | 84/470 R |
| 3,377,716 | A * | 4/1968 | Schmoyer | 84/478 |
| 3,616,723 | A * | 11/1971 | Gullickson | 84/478 |
| 3,724,102 | A | 4/1973 | Van Patten | |
| 4,061,337 | A * | 12/1977 | Callender | 273/243 |
| 4,531,310 | A * | 7/1985 | Acson et al. | 40/1.5 |
| 4,703,573 | A | 11/1987 | Montgomery et al. | |
| 4,791,741 | A * | 12/1988 | Kondo | 704/272 |
| 4,819,539 | A * | 4/1989 | Searing | 84/476 |
| 4,936,780 | A * | 6/1990 | Cogliano | 434/311 |
| 5,496,179 | A * | 3/1996 | Hoffman | 434/433 |
| 5,525,060 | A | 6/1996 | Loebner | |
| 5,546,843 | A * | 8/1996 | Degaard | 84/478 |

(Continued)

FOREIGN PATENT DOCUMENTS

JP    2004-126351 A    4/2004

(Continued)

OTHER PUBLICATIONS

P.F. Brown et al, "Probabilistic Flash Cards", IBM Technical Disclosure Bulletin 35 (3), Aug. 1992: 370-373.

*Primary Examiner* — Elvin G Enad
*Assistant Examiner* — Robert W Horn
(74) *Attorney, Agent, or Firm* — Capitol Patent & Trademark Law Firm, PLLC

(57) ABSTRACT

To help young children and other individuals learn music while playing and having fun, a novel card or device is presented that includes, on a first side, an image of a musical note on its surface, and on a second side an image of at least a portion of a musical instrument on its surface, the portion indicating a location on the instrument responsible for creating an audible sound associated with the musical note on the first side.

12 Claims, 2 Drawing Sheets

U.S. PATENT DOCUMENTS

| | | | |
|---|---|---|---|
| 5,588,678 A * | 12/1996 | Young | 704/272 |
| 5,641,164 A * | 6/1997 | Doederlein et al. | 273/237 |
| 5,788,502 A | 8/1998 | Shea | |
| 5,816,821 A | 10/1998 | Ouellette et al. | |
| 5,836,587 A | 11/1998 | Druce et al. | |
| 5,855,001 A * | 12/1998 | Doederlein et al. | 704/270 |
| 5,863,043 A | 1/1999 | Bitner | |
| 5,865,625 A | 2/1999 | Baskerville | |
| 5,868,393 A | 2/1999 | Williams | |
| 5,899,698 A | 5/1999 | Sandlin | |
| 5,938,199 A * | 8/1999 | Doederlein et al. | 273/237 |
| 5,949,010 A * | 9/1999 | Hacker | 84/476 |
| 6,086,378 A * | 7/2000 | Johnson | 434/128 |
| 6,111,180 A * | 8/2000 | DiGiulio | 84/471 R |
| 6,127,616 A * | 10/2000 | Yu | 84/483.2 |
| 6,204,441 B1 * | 3/2001 | Asahi et al. | 84/470 R |
| 6,271,453 B1 * | 8/2001 | Hacker | 84/476 |
| 6,282,819 B1 * | 9/2001 | Gu | 40/124.03 |
| 6,284,961 B1 * | 9/2001 | Kimmel, Jr. | 84/478 |
| 6,292,780 B1 * | 9/2001 | Doederlein et al. | 704/270 |
| 6,337,434 B2 * | 1/2002 | Oren-Chazon | 84/478 |
| 6,434,518 B1 | 8/2002 | Glenn | |
| 6,588,756 B1 * | 7/2003 | Hughes | 273/292 |
| 6,727,417 B2 * | 4/2004 | Oren-Chazon | 84/470 R |
| 6,845,583 B2 * | 1/2005 | Lee | 40/717 |
| 6,870,085 B2 * | 3/2005 | MacCutcheon | 84/477 R |
| 6,884,076 B2 | 4/2005 | Clark et al. | |
| 6,930,713 B1 * | 8/2005 | Adams et al. | 348/231.99 |
| 6,948,938 B1 | 9/2005 | Tseng | |
| 6,966,777 B2 | 11/2005 | Robotham | |
| 7,080,982 B2 | 7/2006 | Rawlins et al. | |
| 7,292,681 B2 * | 11/2007 | Pines | 379/88.28 |
| 7,356,950 B1 * | 4/2008 | Avery | 40/124.02 |
| 7,576,280 B2 * | 8/2009 | Lauffer | 84/626 |
| 7,584,895 B2 * | 9/2009 | Zellner et al. | 235/487 |
| 7,732,695 B1 * | 6/2010 | Sanderson | 84/470 R |
| 7,754,954 B2 * | 7/2010 | Neil | 84/470 R |
| 2002/0137012 A1 | 9/2002 | Hohl | |
| 2002/0142271 A1 | 10/2002 | Curtin | |
| 2003/0198921 A1 | 10/2003 | Ueda | |
| 2004/0083111 A1 | 4/2004 | Rehbein et al. | |
| 2005/0147952 A1 * | 7/2005 | Morris et al. | 434/311 |
| 2007/0048693 A1 | 3/2007 | Hannan | |
| 2007/0048694 A1 | 3/2007 | Tepper | |
| 2007/0054246 A1 | 3/2007 | Winkler et al. | |
| 2007/0238075 A1 | 10/2007 | Mauch et al. | |
| 2007/0255570 A1 | 11/2007 | Annaz et al. | |
| 2007/0269775 A1 | 11/2007 | Andreev et al. | |
| 2008/0108028 A1 | 5/2008 | Lou-Hsiao | |
| 2009/0111075 A1 * | 4/2009 | Midkiff | 434/157 |
| 2010/0059983 A1 | 3/2010 | Galloway et al. | 283/56 |
| 2011/0094367 A1 * | 4/2011 | Midkiff | 84/470 R |

FOREIGN PATENT DOCUMENTS

| | | |
|---|---|---|
| WO | 2006/051342 A3 | 5/2006 |

* cited by examiner

US 8,106,280 B2

DEVICES AND RELATED METHODS FOR TEACHING MUSIC TO YOUNG CHILDREN

RELATED APPLICATION

This application is related to U.S. patent application Ser. No. 12/235,627 entitled "Devices and Related Methods For Teaching Languages To Young Children", the disclosure of which is incorporated by reference herein as if set forth in full herein.

BACKGROUND OF THE INVENTION

With ever-increasing regularity young children are taught music before they reach grammar school. Teaching a child music requires many skills, not the least of which is patience. A young child's learning can be enhanced through playing and having fun. However, there are few, if any, "music learning" toys available.

Enhancing the ability to teach children musical notes and sounds, especially in situations where music teachers and formal music lessons are not accessible, is highly desirable.

SUMMARY OF THE INVENTION

Given this problem, the inventor designed a new toy (or tool; collectively referred to as "tool") that can help young children learn music while playing and having fun. This tool is referred to as a "YaYa" Music card.

In one embodiment of the invention, Yaya Music cards may take the form of a set of cards. On the surface of a front or first side of each card is an image of a musical note. On the surface of a back or second side of each card is an image of at least a portion of a musical instrument, the portion indicating a location on the instrument responsible for creating an audible sound associated with the musical note on the front side. For example, the back side image may include an illustration of a piano key and its position on a piano that corresponds to a note on the front side. An adhesive (e.g., sticky pads, magnets) on one side of the card can be used to attach the card to different surfaces or objects, such as an instrument similar to that shown in the image on the back side. A card also includes electronics and related mechanisms that allow audible sounds to be emitted when the card is touched, the sounds being associated with a musical note or notes on the card. In yet another alternative embodiment, the card may include visual components, such as blinking lights so that it will be fun for children to touch and play with the card.

DETAILED DESCRIPTION OF THE INVENTION

It is well-known that the earlier a child or person begins to learn music the greater the chances of success. In particular, it is important to train a person's ears to recognize sounds and then associate the sounds to a musical note or notes. Advantageously, YaYa Music cards can be used with very young children even those as young as a few months old.

In one embodiment of the invention, a Yaya Music card has two sides: a front or first side, and a back or second side.

Figure 1:
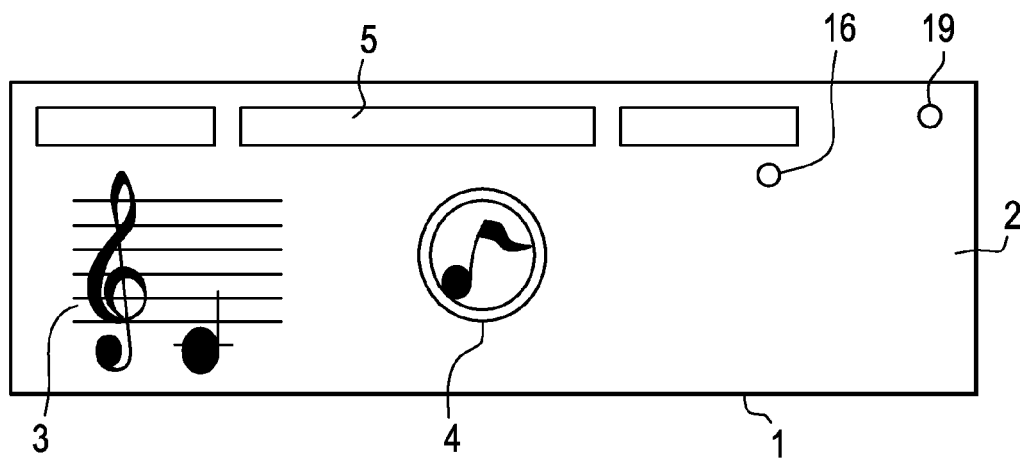
FIG. 1 depicts one example of one side of a YaYa Music card according to one example of the present invention.

Referring now to FIG. 1, there is shown an example of a front or first side 2 of a YaYa Music card 1. The first side 2 may comprise an image of a musical note 3 on its surface. For example, to illustrate the concepts of the present invention, an image 3 of the musical note Middle C is shown, it being understood that the inventive concepts can be used to teach any musical note or note combinations.

Continuing with FIG. 1, optionally, a touching area 4 may be included on the first side 2. Alternatively, the area 4 may be placed on a second or back side of the card 1. Yet further, a battery indicator 5 associated with a battery that powers the card 1 may be included on the first side 2.

Figure 2:
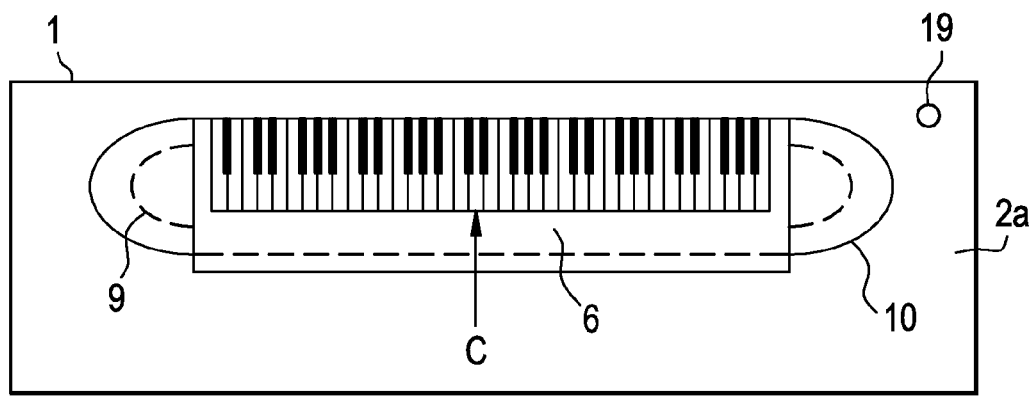
FIG. 2 depicts one example of a second side of a YaYa Music card according to one example of the present invention.

Referring now to FIG. 2, there is depicted an example of a back or second side 2a of the card 1. The second side 2a may include an image 6 of at least a portion of a musical instrument (e.g., piano), the portion 6 indicating, for example, a location on an instrument responsible for creating an audible sound associated with the musical note 3 on the front side 2.

The back side 2a may be covered with an adhesive 9 on its surface which in turn may be covered by paper 10 or the like. Once the paper 10 is peeled off, the card 1 is operable to be secured to an instrument similar to that shown in the image 6 (e.g., piano) so the child can visually associate the image 6 with an actual instrument. It should be understood that an adhesive is only one way secure the card 1 to an object, such as instrument. Other securing means and ways may also be used, for example, by means of a magnet or the like. The securing means may be removable, separately attachable (e.g. by an individual) or permanently connected to the card 1 as well. In any event the securing means acts to secure the card to an object temporarily (e.g., a few seconds or minutes) or permanently (over 30 minutes), though typically it will be secured temporarily.

Before going further, it should be understood that each of the elements of the first side may be placed on the second side, and vice-versa.

Though the thickness of the card 1 is not shown in FIGS. 1 and 2 it should be understood that the thickness may vary in accordance with a particular application or technology used to manufacture the card. Yet further, the surface of the cards may be made of a different material than the remaining thickness to a make it easier to include a touch pad, decorate the surfaces with letters and symbols, etc.

It should be further understood that although the word "card" is used the physical embodiments of the invention may take the form of other shapes, sizes and designs.

In an exemplary operation, when a person (a child, for example) touches the touch area 4 with a finger or an object (e.g., pencil), the area 4 may be operable to cause the output of an audible sound associated with the musical note 3 and/or cause a visual indicator 16 to emit light (e.g., blink). The idea is to allow a child to look and hear the note 3 again and again when she/he is in a certain environment so the repetition will, in time, teach the child the sound of the note 3. Also, the image of the note 3 allows the child to recognize what the note 3 looks like when written. Alternatively, upon touching the area 4 the area 4 is operable to cause the output of a series of audible sounds when the image of the note 3 represents a plurality of notes.

In a further embodiment of the invention the surfaces of the sides 2,2a may include a plastic cover over a paper-based surface to protect the sides 2,2a from dirt or liquids. Further, the card 1 may be designed to include one or more colors as backgrounds or the like and may be made into different shapes (e.g., rectangular, square, oval, etc.).

To facilitate the output of audio sounds or visual light, the card may include the appropriate electronics and mechanisms. Some of the electronics are shown in FIG. 3.

Figure 3:
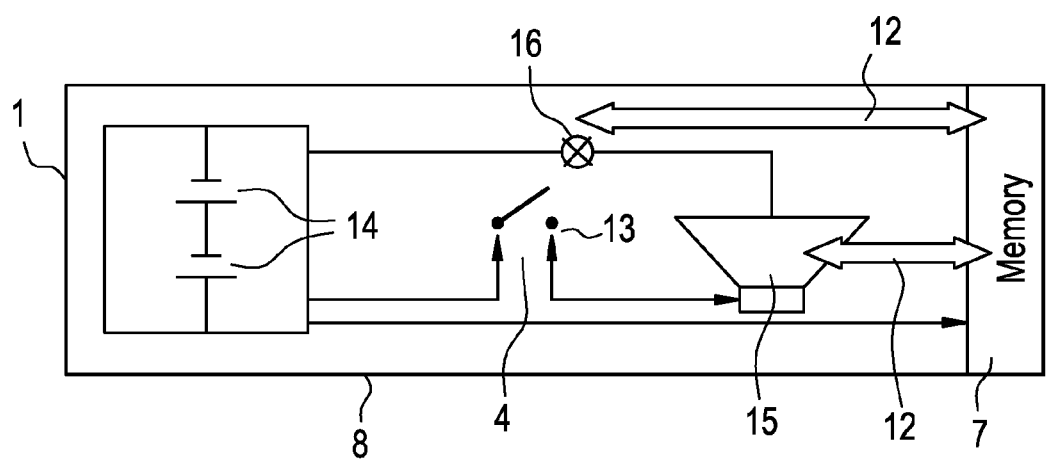
FIG. 3 depicts one example of a block diagram of some of the components inside a Ya Ya Music card according to one example of the invention.

Referring now to FIG. 3 there is shown a block diagram 8 of the inside of the card 1. As shown the touch area or pad 4 is connected to a switch or the like 13 embedded within the card 1 and substantially underneath, and associated with, the pad 4. In one embodiment of the invention, upon applying pressure (e.g., touching) to the pad 4 the switch 13 associated with the pad 4 is operable (e.g., closed) to connect a power source 14 to the audible source (e.g., speaker) 15 and/or visual indicator 16 (e.g., light emitting diode {LED}). It should be understood that the touch area 4 may comprise a portion of the surface of side 2 or substantially the entire surface. Yet further, the touch area may be placed on side 2*a*. Similarly, the switch 13 associated with the touch area 4 may vary in size. In an alternative embodiment of the invention the visual indicator 16 may comprise one or more light sources and/or LEDs outputting the same, or different colors.

When power (from the battery 14, for example) is received by the audible source 15 it emits a sound or the like. Similarly, when power is received by the indicator 16 it emits light. In yet additional embodiments of the invention the card 1 includes a processor and/or memory 7 (collectively "memory") operable to store a selection of audible sounds that may be used when audibly outputting sounds associated with musical notes. Because the number of unique notes is not large, the present invention provides for embodiments where a set of YaYa Music cards, and their associated memories, contain all of the musical notes. Alternatively, in another embodiment a set of cards and associated memories include a subset of all of the musical notes.

Additionally, the memory 7 may be operable to store data for controlling a signal pattern sent to the indicator 16 that effects the visual light pattern output (e.g., blinking pattern) via bus 12. Yet further, the memory 7 may comprise a special purpose sound "chip" that is operable to control the operations set forth above and one or more of the internal components of the card 1.

Though some of the electronic components, and one exemplary circuit, of the card 1 are shown in FIG. 3, it should be understood that others may also be used and/or may be included. However, these other components, circuits and their connections are readily understood and known by those skilled in the art and, therefore, have not been shown in FIG. 3. The internal components of the card 1 may be surrounded by a foam or other similar material.

YaYa Music cards are not intended to replace tutoring, teaching and other forms of practice, but they can help children get an early start on learning music as well as generate a life-long interest in music, all while having fun.

Though examples and embodiments of the invention have been discussed above, those skilled in the art will readily understand that the present invention encompasses other embodiments. For example, in addition to securing means the card 1 may also or alternatively include a hole or similar passageway 19 made through its surface or surfaces (e.g., at a corner) to allow the card 1 to be placed on a ring, key chain or some other grip-like component so that people could keep various cards together and take and/or hold the cards (or card) with them when they travel.

I claim:

1. A card for teaching a child to learn music comprising:
    a front side comprising an image of a musical note on its surface;
    a back side comprising an image of at least a portion of a musical instrument on its surface, the portion Indicating a location on the instrument responsible for creating an audible sound associated with the musical note on the front side,
    securing means for securing the card to an instrument similar to that shown in the image on the back side;
    a touch area operable to output an audible sound associated with the musical note and to cause a visual indicator to emit light during operation,
    wherein, during operation, the audible sound and visual indicator are powered by a battery whose strength is indicated by a battery strength indicator operable to detect the battery strength.

2. The card in claim 1 further comprising a memory operable to store a selection of audible sounds used to audibly output sounds associated with musical notes.

3. The card as in claim 1 wherein the securing means comprises an adhesive.

4. The card as in claim 1 wherein the securing means comprises a magnet.

5. The card as in claim 1 further comprising a passageway through a surface of the card.

6. A device for teaching a person to learn music, the device comprising:
    a front side comprising an image of a musical note on its surface and a touch area operable to cause a visual indicator to emit light and the output of an audible sound associated with the musical note;
    a back side comprising an image of at least a portion of a musical instrument on its surface, the portion indicating a location on the instrument responsible for creating an audible sound associated with the musical note on the front side, and
    securing means for securing the device to an instrument similar to that shown in the image on the back side;
    wherein, during operation, the audible sound and visual indicator are powered by a battery whose strength is indicated by a battery strength indicator operable to detect the battery strength.

7. The device in claim 6 further comprising a memory operable to store a selection of audible sounds used to audibly output sounds associated with musical notes.

8. The device in claim 6 wherein the securing means comprises an adhesive.

9. The device in claim 6 wherein the securing means comprises a magnet.

10. The device as in claim 6 further comprising a passageway through a surface of the device.

11. A method for teaching e child to learn music using a card comprising:
    providing a card that comprises, on a front side, an image of a musical note on its surface, and on a back side an image of at least a portion of a musical instrument on its surface on its surface, the portion indicating a location on the Instrument responsible for creating an audible sound associated with the musical note on the front side during operation;
    providing a securing means to secure the device to an instrument similar to that shown in the image on the back side;
    providing a touch area operable to cause a visual indicator to emit light and the output of an audible sound associated with the musical note during operation;
    providing, during operation, a battery to power the audible sound and visual indicator: and providing a battery strength indicator operable to detect a strength of the battery.

12. A method for teaching a person to learn music using a teaching device that includes a musical note comprising:

provide a card that comprises a teaching device that includes, on a front side, an image of the musical note on its surface, and on a back side an image of at least a portion of a musical instrument on its surface, the portion Indicating a location on the instrument responsible for creating an audible sound associated with the musical note on the front side during operation;

providing a securing means to secure the teaching device to an instrument similar to that shown in the image on the back side;

providing a touch area operable to cause a visual indicator to emit light and the output of an audible sound associated with the musical note during operation;

providing, during operation, a battery to power the audible sound and visual indicator: and providing a battery strength indicator operable to detect a strength of the battery.

\* \* \* \* \*